US006891884B1

(12) United States Patent
Ohnishi (10) Patent No.: US 6,891,884 B1
(45) Date of Patent: May 10, 2005

(54) APPARATUS FOR DETECTING CORRELATION, SPECTRUM DESPREAD APPARATUS AND RECEIVER HAVING THE SAME, AND METHOD FOR DETECTING CORRELATION

(75) Inventor: Osamu Ohnishi, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 09/512,384

(22) Filed: Feb. 25, 2000

(30) Foreign Application Priority Data

Mar. 1, 1999 (JP) .......................... 11/053319

(51) Int. Cl.[7] .......................... H04B 1/69; H04B 1/707; H04B 1/713
(52) U.S. Cl. .................. 375/150; 375/130; 375/142; 375/143; 375/152
(58) Field of Search ................ 375/150, 152, 375/134, 130, 142, 143; 370/342

(56) References Cited

U.S. PATENT DOCUMENTS

| 5,903,595 A | * | 5/1999 | Suzuki ........................ 375/152 |
| 6,118,808 A | * | 9/2000 | Tiemann et al. ............ 375/142 |
| 6,345,069 B1 | * | 2/2002 | Dabak et al. ................ 375/152 |

FOREIGN PATENT DOCUMENTS

| JP | 08-172342 | 7/1996 |
| JP | 9-55715 | 2/1997 |
| JP | 10-32560 | 2/1998 |
| JP | 2778396 | 5/1998 |
| JP | 10-173485 | 6/1998 |
| JP | 10-178334 | 6/1998 |
| JP | 10-322308 | 12/1998 |
| JP | 10-327126 | 12/1998 |
| JP | 2000-124836 | 4/2000 |
| JP | 2000-174661 | 6/2000 |
| JP | 2000-196498 | 7/2000 |
| JP | 2000-252869 | 9/2000 |
| WO | WO99/06922 | 2/1999 |

OTHER PUBLICATIONS

Hideshi, Murai, Patent Abstracts of Japan; Publication No. 06077931 Mar. 18, 1994, Receiver for Spread Spectrum Signal.

* cited by examiner

*Primary Examiner*—Stephen Chin
*Assistant Examiner*—Curtis Odom
(74) *Attorney, Agent, or Firm*—Foley & Lardner LLP (57) ABSTRACT

An apparatus is provided for detecting a correlation of samples with a spread code comprising: an L-chip accumulator which inputs the samples to generate and output an intermediate correlation signal; M memories, each of which stores L×M samples of the intermediate correlation signal; an adder which has input terminals as many as M and inputs from each of the input terminals the intermediate correlation signal which is outputted from the L-chip accumulator or the intermediate correlation signal which is outputted from a corresponding memory among the memories; and a controller which supplies the intermediate correlation signal outputted from the L-chip accumulator to the memories as many as M and to the M input terminals of the adder in rotation with a unit of L×N samples, and reads, and supplies to each of the input terminals of the adder, the intermediate correlation signal which has been stored in each of the memories M−1 times; wherein an output of the adder is outputted as an correlation signal outputted from the apparatus.

18 Claims, 8 Drawing Sheets

| CYCLE | P1 | P2 | P3 | P4 | P5 | P6 | P7 | P8 | P9 | P10 | P11 | P12 |
|---|---|---|---|---|---|---|---|---|---|---|---|---|
| X1(107-1) | 1 | 1 | $\overline{1}$ | 1 | 5 | 5 | $\overline{5}$ | 3 | 9 | 9 | $\overline{9}$ | 9 |
| X2(107-2) |   | 2 | 2 | $\overline{2}$ | 2 | 6 | 6 | $\overline{6}$ | 6 | 10 | 10 | $\overline{10}$ |
| X3(107-3) |   |   | 3 | 3 | $\overline{3}$ | 3 | 7 | 7 | $\overline{7}$ | 7 | 11 | 11 |
| X4(107-4) |   |   |   | 4 | 4 | $\overline{4}$ | 4 | 8 | 8 | $\overline{8}$ | 8 | 12 |

APPARATUS FOR DETECTING CORRELATION, SPECTRUM DESPREAD APPARATUS AND RECEIVER HAVING THE SAME, AND METHOD FOR DETECTING CORRELATION

BACKGROUND OF THE INVENTION

1. Field of the Invention

The present invention relates to an apparatus and method for detecting a correlation which outputs a correlation signal indicative of a correlation between a transmitted signal which has been spread in spectrum and a spread code signal, and a spectrum despread apparatus and receiver having the apparatus for detecting a correlation.

2. Description of the Prior Art

CDMA (Code Division Multiple Access) system attracts attention as a multiple access system in a mobile communication system including base stations and transmission/reception terminals as portable mobile stations, because the CDMA system has a possibility to drastically increase subscriber capacity. In the CDMA system, a signal to be transmitted is spread in spectrum with a spread code signal such as a M-sequence code signal and a Gold sequence code signal before transmission from a transmitting apparatus, which is a base station or a transmission/reception terminal, and a transmission signal received by a receiving apparatus, which is the transmission/reception terminal or the base station, is despread by the same spread code signal as the transmitting apparatus to produce a decoded signal.

In order to despread a transmission signal with a spread code signal in a spectrum despread apparatus of a receiving apparatus, it is necessary to generate a spread code signal having a sequence and phase which are the same as the transmission signal. The phase of the spread code signal which has spread the transmission signal is detected by detecting a peak timing of an output of a correlation detecting apparatus.

Figure 6:
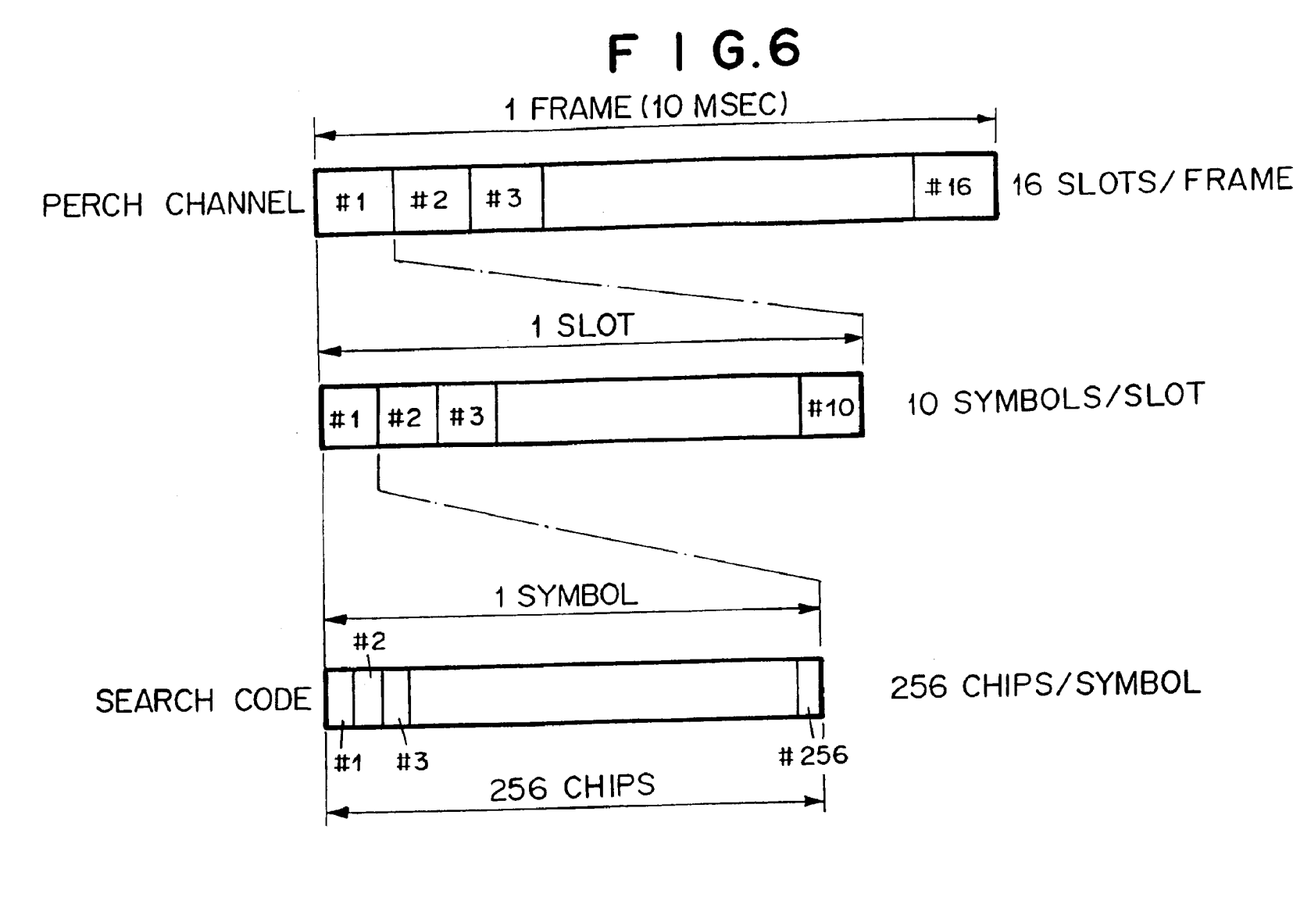
FIG. 6 is a format diagram of a Perch Channel of the W-CDMA system proposed by ARIB.
Figure 7:
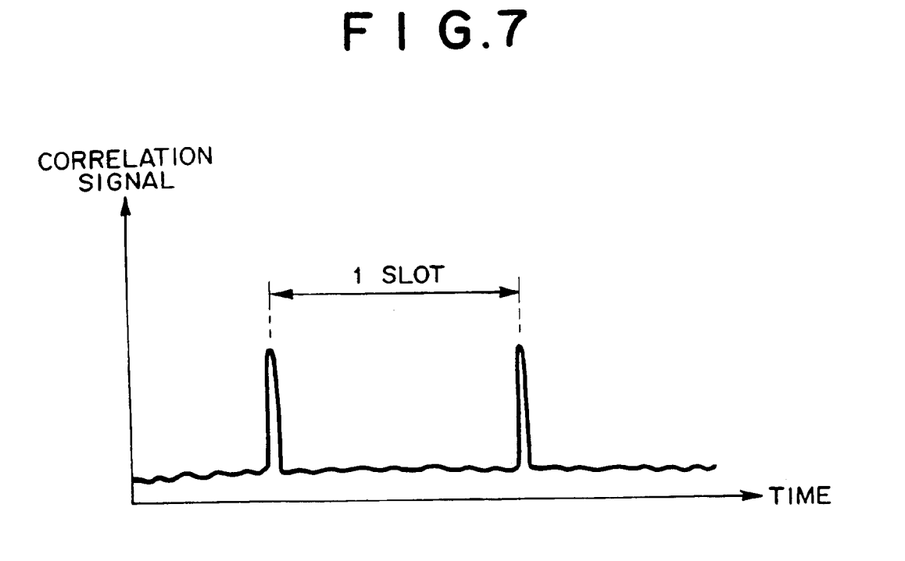
FIG. 7 is a graph showing an output of an apparatus for detecting correlation.

According to a signal format of a W-CDMA (Wideband Code Division Multiple Access) system proposed by ARIB (Association of Radio Industries and Businesses) as shown in FIG. 6, Perch Channel's one frame having a period of 10 msec is divided into 16 slots and each slot is divided into 10 symbols. A Search Code is assigned to the first symbol of each slot. The Search Code is a code common among all the transmission/reception terminals and composed of 256 chips. A correlation detecting apparatus of each transmission/reception terminal outputs a correlation signal in one slot time at a minimum by using the Search Code. The correlation detecting apparatus outputs a correlation signal as shown in FIG. 7 as a phase detection signal. In addition, the correlation detecting apparatus oversamples each chip. An oversampling frequency thereof is, for example, a double or quadruple of a chip rate.

Formerly, the Search Code consisting of 256 chips was of 256 period. ARIB, however, has proposed the Search Code of L×M period, where L×M=256. The Search Code of L×M period is a Search Code which repeats a spread signal of a period of L by M times. The values of L and M are integers larger than one. The values of L and M are, for example, 16 and 16, respectively. The Search code of L×M is inverted or not inverted in a unit of the value of M in accordance with a prescribed rule. There may be an extreme rule which does not invert the Search Code at all.

Figure 8:
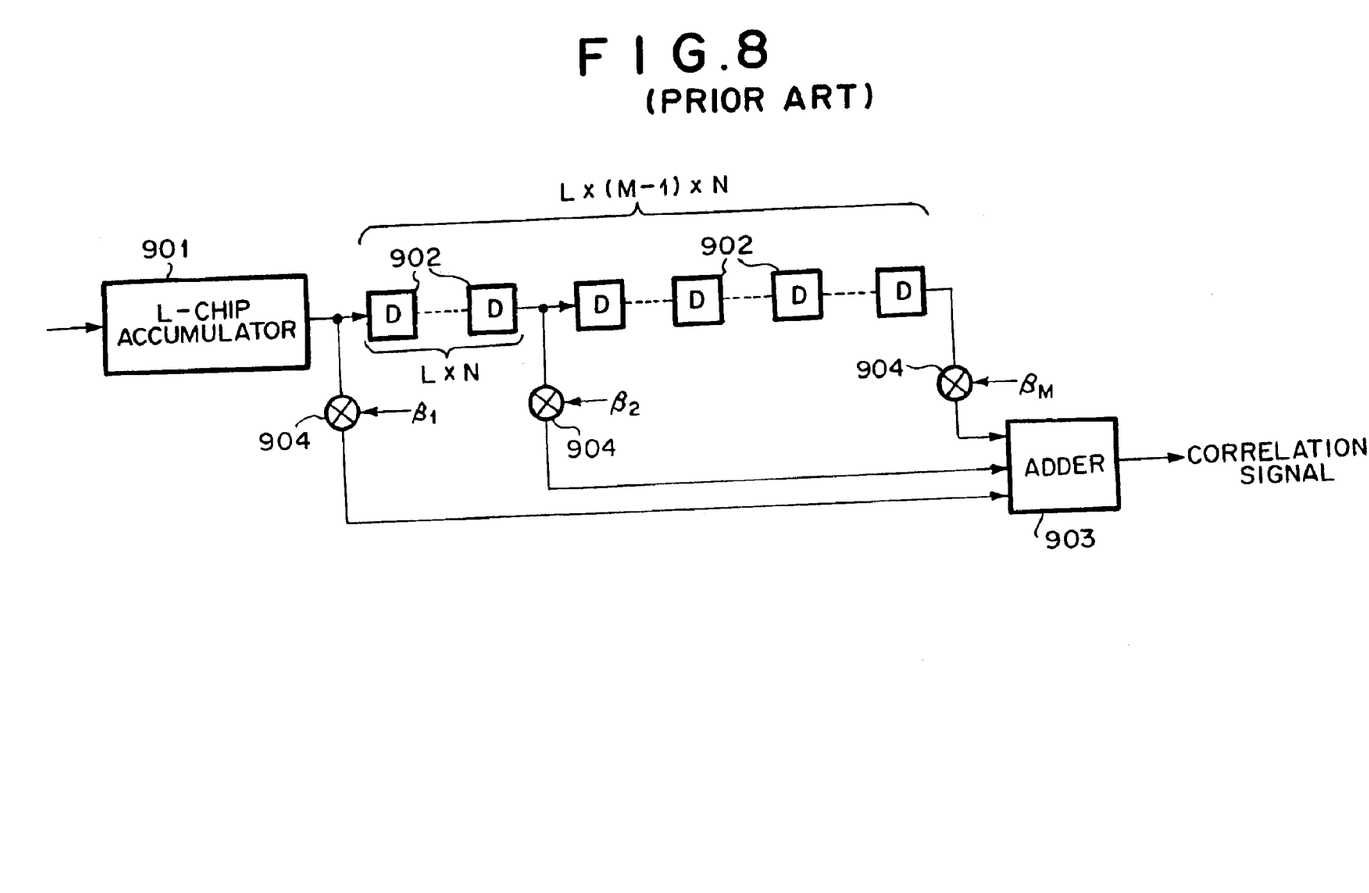
FIG. 8 is a block diagram showing the structure of a conventional apparatus for detecting correlation.

The correlation detection apparatus proposed by ARIB, AIF/SWG2-28-18, Cell Search Scheme for 1st and 2nd stage, ST8 as shown in FIG. 8 comprises L-chip accumulator 901, shift register 902 consisting of D-type flip-flops as many as L×(M−1)×N, adder 903 having inputs as many as M, and multiplier 904 as many as M.

L-chip accumulator 901 may be, for example, a matching filter or a correlator bank.

Figure 5:
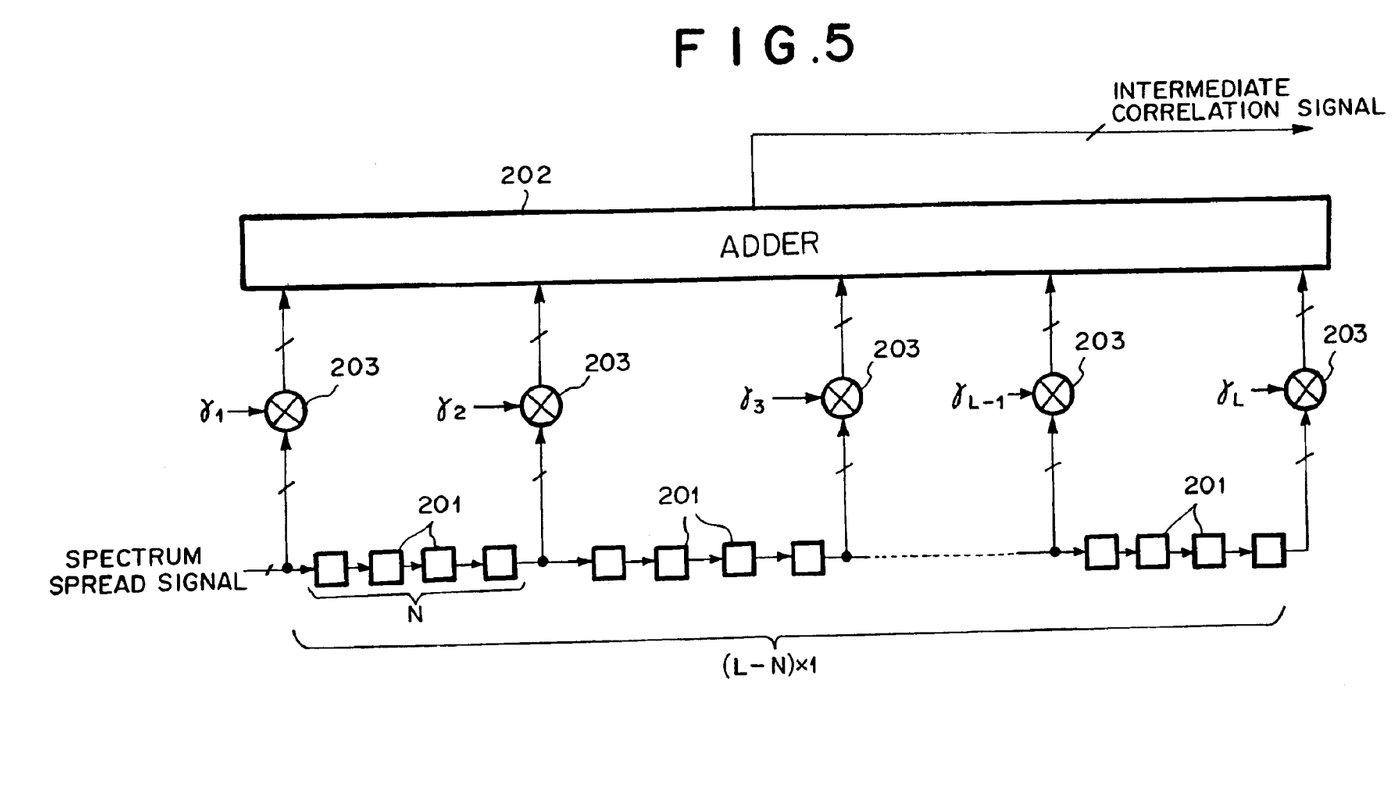
FIG. 5 is a circuit diagram showing the structure of a matching filter.

As shown in FIG. 5, a matching filter as an example of L-chip accumulator 901 comprises shift register 201 consisting of D-type flip-flops as many as (L−1)×N, multipliers 203 as many as L which multiply signals derived from every N-th taps of shift register 201 with coefficients $\gamma_i$ (i=1, 2, . . . , L), and adder 202 which sums up the outputs of multipliers 203. The matching filter takes a form of a transversal filter.

A bit width of an input of L-chip accumulator 901 is, for example, 8. A bit width of an output of L-chip accumulator 901 is 12 if the bit width of the input of L-chip accumulator 901 is 8 and the number L of inputs of adder 202 is 16.

Next, the operation of the correlation detecting apparatus will be explained with reference to FIGS. 5 and 8.

A transmission signal which has been oversampled into N samples per chip is inputted to L-chip accumulator 901. L-chip accumulator 901 adds/subtracts samples as many as L and outputs an intermediate correlation signal at each clock tick of the oversampling frequency.

The intermediate correlation signal and delayed intermediate correlation signals which are derived from every L×N-th tap of shift register 902 are inputted to multipliers 904. The coefficients $\beta_m$ (m=1, 2, . . . , M) of multipliers 904 are determined in accordance with the Search Code with L×M period. Adder 903 sums up outputs of multipliers 904 to output the sum thereof as a final correlation signal.

However, the correlation detecting apparatus as shown in FIG. 8 has disadvantages as follows:

A first disadvantage is that shift register 902 is composed of a large number of D-type flip-flops as many as L×(M−1)×N. This causes an increase in circuit scale.

A second disadvantage is that input the data and output data of the D-type flip-flops, as many as L×(M−1)×N, constituting shift register 902 change at each clock tick of the oversampling frequency. This causes an increase in necessitative power consumption.

The above disadvantages are serious for a portable type of a transmission/reception terminal which operates with a battery if the correlation detecting apparatus of FIG. 8 is incorporated therein.

SUMMARY OF THE INVENTION

In order to overcome the aforementioned disadvantages, the present invention has been made and accordingly, has an object to provide a correlation detecting apparatus which outputs an accurate and reliable correlation signal and is reduced in circuit scale and power consumption.

The present invention has another object to provide a spectrum despread apparatus, receiving terminal, and transmitting/receiving apparatus, each of which has the correlation detecting apparatus which outputs an accurate and reliable correlation signal and is reduced in circuit scale and power consumption.

The present invention has further object to provide a correlation detecting method which outputs an accurate and reliable correlation signal and reduces circuit scale and power consumption.

According to a first aspect of the present invention, there is provided an apparatus for detecting a correlation of samples with a spread code, the samples being obtained by sampling a spectrum spread signal in a range of one symbol period with a oversampling rate which is N-fold of a chip rate, wherein N is an integer larger than zero, the spread code being of L×M period per symbol, wherein L and M are integers larger than one, the spectrum spread signal having been spread in spectrum by the spread code signal, the apparatus comprising: an L-chip accumulator which inputs the samples to generate and output an intermediate correlation signal; M memories, each of which stores L×M samples of the intermediate correlation signal; an adder which has M input terminals and inputs from each of the input terminals the intermediate correlation signal which is outputted from the L-chip accumulator or the intermediate correlation signal which is outputted from a corresponding memory among the memories; and a controller which supplies the intermediate correlation signal outputted from the L-chip accumulator to the M memories and to the M input terminals the adder in rotation with a unit of L×N samples, and reads, and supplies to each of the input terminals of the adder, the intermediate correlation signal which has been stored in each of the memories M−1 times; wherein an output of the adder is outputted as an correlation signal outputted from the apparatus.

The apparatus may further comprises: M multipliers, each of which is connected with each of the memories and each of the input terminals of the adder; and a coefficient generator which generates coefficients of the multipliers; wherein each of the coefficients changes cyclically in a unit of L×N-fold of a period corresponding to the oversampling rate.

The memories may be one-port type of memories.

The L-chip accumulator may be a matching filter or a correlator bank.

According to a second aspect of the present invention, there is provided an apparatus for detecting a correlation, comprising: an accumulator which inputs a reception signal to output a first correlation signal in response to the reception signal, the first correlation signal including first data and second data following to the first data; a first memory which stores the first data included in the first correlation signal; a second memory which stores the second data included in the first correlation signal; and an adder; wherein the first data is supplied to the adder in a first period when the first data are written to the first memory; wherein the second data and the first data which have been stored in the first memory are supplied to the adder in a second period when the second data are written to the second memory; and wherein an output of the adder is outputted as a final correlation signal.

According to a third aspect of the present invention, there is provided an apparatus for detecting correlation, comprising: an accumulator which outputs a first correlation signal in response to a reception signal; a plurality of memories, each of the memories stores the first correlation signal in a respective prescribed period; an adder which inputs the first correlation signals from the plurality of memories and from the accumulator; and a controller which supplies the first correlation signals which have been stored in memories other than a first memory among the plurality of memories when the first correlation signal is written to the first memory.

According to a fourth aspect of the present invention, there is provided a spectrum despread apparatus, reception terminal, and transmission/reception terminal, each of which comprising the above apparatus.

According to a fifth aspect of the present invention, there is provided a method for detecting a correlation of samples with a spread code, the samples being obtained by sampling a spectrum spread signal in a range of one symbol period with a oversampling rate which is N-fold of a chip rate, wherein N is an integer larger than zero, the spread code being of L×M period per symbol, wherein L and M are integers larger than one, the spectrum spread signal having been spread in spectrum by the spread code signal, the method comprising steps of generating an intermediate correlation signal by using the samples; writing samples of the intermediate correlation signal to memories as many as M in rotation with a unit of L×N samples; supplying the samples of the intermediate correlation signal to input terminals as many as M of an adder simultaneously with the step of writing; reading samples as many as L×N of the intermediate correlation signal which have been stored in each of the memories M−1 times; supplying the samples read in the step of reading to each of the input terminals of the adder; and outputting an output of the adder as a correlation signal.

The above method may further comprises a step of multiplying the samples supplied to each of input terminals of the adder with a coefficient which changes cyclically in a unit of L×N-fold of a period corresponding to the oversampling rate.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

Figure 1:
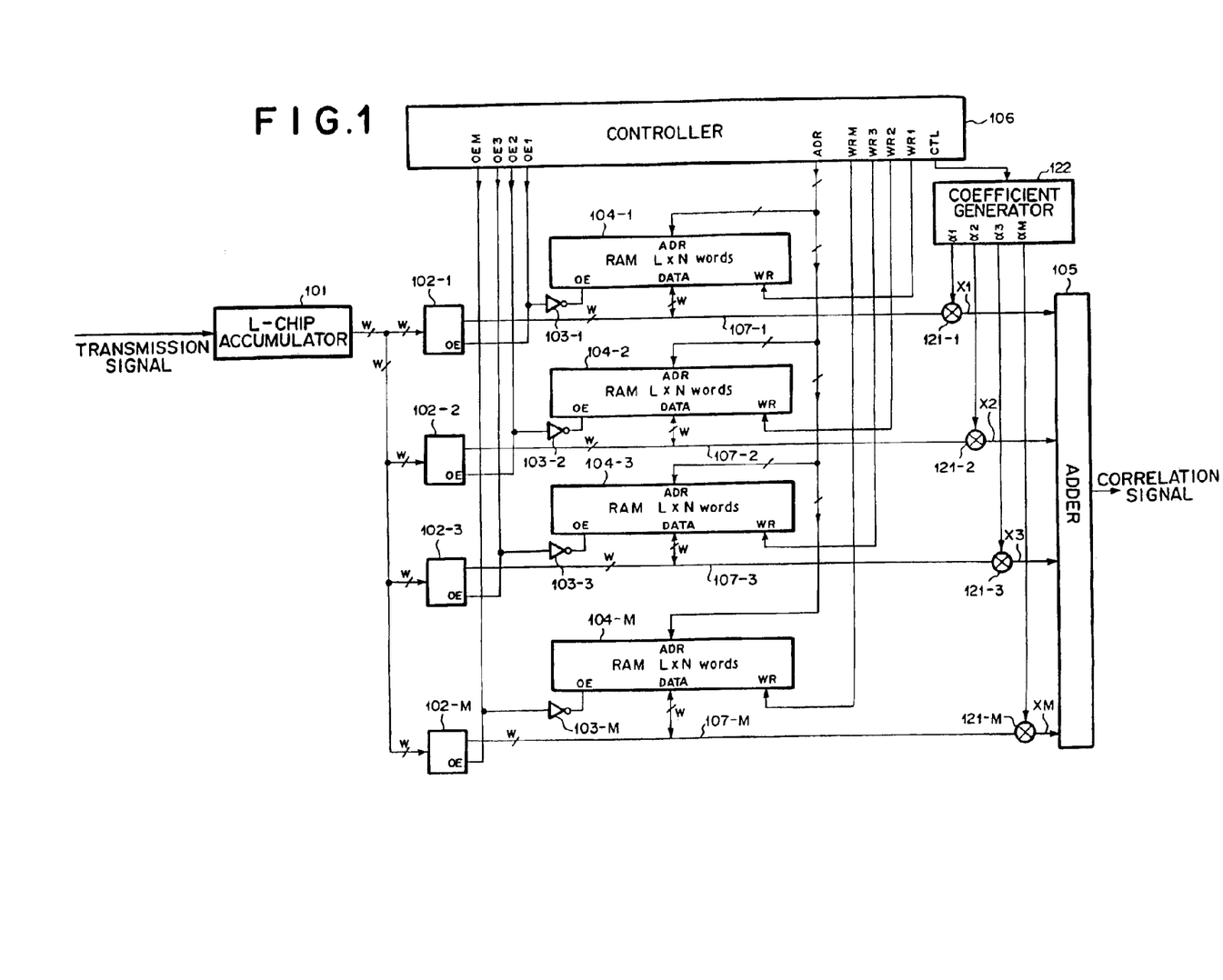
FIG. 1 is a block diagram showing the structure of an apparatus for detecting correlation according to an embodiment of the present invention.

Referring to FIG. 1, a correlation detecting apparatus according to the embodiment of the present invention comprises L-chip accumulator 101, buffers 102-1 . . . 102-M, inverters 103-1 . . . 103 . . . M, one port type of RAMs 104-1 . . . 104-M, adder 105, controller 106, multipliers 121-1 . . . 121-M, and coefficient generator 122. A bit width of an intermediate correlation signal which is an output of L-chip accumulator 101, a bit width of an output of buffers 102-1 . . . 102-M, bit widths of input and output of RAMs 104-1 . . . 104-M are 12 if a bit width of an input of L-chip accumulator 101 is 8 and the value of L is 16. A bit width of an output of adder 105 is 16 if a bit width of an input of L-chip accumulator 101 is 8, the value of L is 16 and the value of M is 16. L-chip accumulator 101, buffers 102-1 ... 102-M, RAMs 104-1 ... 104-M, adder 105 and multipliers 121-1 ... 121-M operate at a frequency of N times of a chip rate, wherein N is an integer larger than zero. The value of N is usually 4.

A transmission signal which has been oversampled at a frequency of N times of chip rate is inputted to L-chip accumulator 101 with a bit width of, for example, 8.

L-chip accumulator 101 is the same as the prior art and such as a matching filter and a correlator bank. An example of the structure of L-chip 101 is as shown in FIG. 5 if it is a matching filter.

An output of L-chip accumulator 101 is inputted to buffers 102-1 ... 102-M. Output lines 107-1 ... 107-M of buffers 102-1 ... 102-M are connected to data input/output terminals of RAMs 104-1 ... 104-M and first input terminals of multipliers 121-1 ... 121-M, respectively. Output enables of buffers 102-1 ... 102M and output enables of RAMs 104-1 ... 104M are controlled complementarily with interpositions of inverters 103-1 ... 103-M, respectively.

Coefficients $\alpha_1 \ldots \alpha_M$ inputted to second input terminals of multipliers 121-1 ... 121-M, respectively, are generated in coefficient generator 122 and generally change every L×N clocks in conformity with a pattern of a Search Code of L×M period.

Multiplier 121-1 inputs one signal selected from an output of buffer 102-1 and an output of RAM 104-1 by output enable OE1. The same is said of multipliers 121-2 ... 121-M.

Adder 105 sums up outputs of multipliers 121-1 ... 121-M to output the sum thereof as a final correlation signal.

Controller 106 outputs address ADR which is used as a write/read address of RAMs 104-1 ... 104-M, output enable signals OE1 ... OEM for controlling output enable terminals of buffers 102-1 ... 102-M and output enable terminals of RAMs 104-1 ... 104-M, respectively, write control signal WR1 ... WRM for RAMs 104-1 ... 104-M, respectively, and control signal CTL for controlling coefficient generator 122.

Next, signals outputted from controller 106 will be explained with reference to FIG. 2. It is assumed that the signals are active when they are HIGH.

Figure 2:
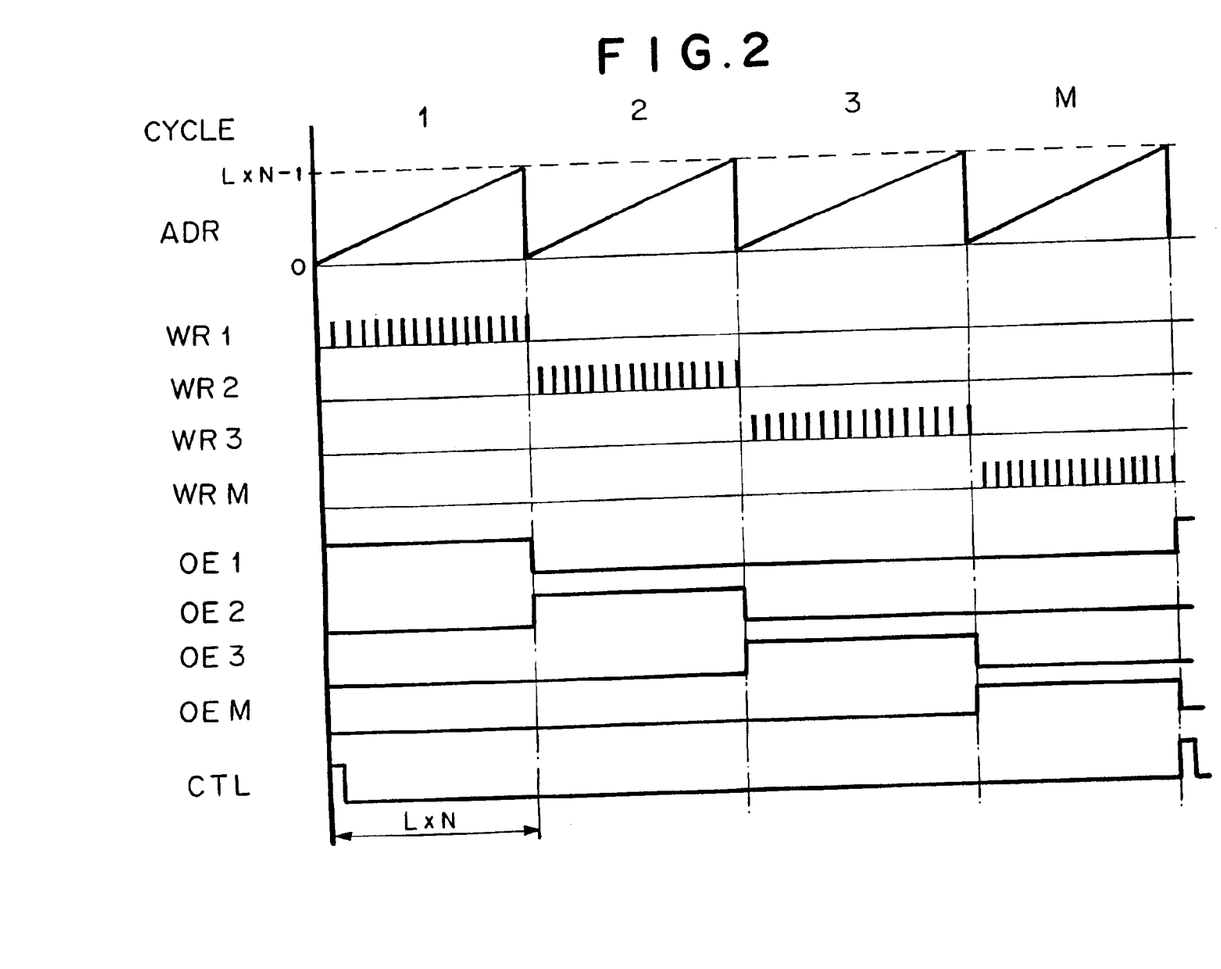
FIG. 2 is a timing chart showing signals which are outputted from controller 106 as shown in FIG. 1.

FIG. 2 shows a first cycle through a M-th cycle, wherein a cycle of L×N clocks is assumed as one cycle. Controller 106 repeatedly outputs the signals as shown in FIG. 2.

Address ADR becomes zero at the beginning of each cycle and is incremented in the range from one to L×N−1 with a step of one. Write pulses of write control signal WR1 are generated every clock in the first cycle and write control signal WR1 is kept inactive in the other cycles. Write control signals WR1 ... WRM similarly become active or inactive with a shift of one cycle from one to another. Output enable signal OE1 is continuously kept active in the first cycle and is continuously kept inactive in the other cycles. Output enable signals OE1 ... OEM similarly become active or inactive with a shift of one cycle from one to another. Control signal CTL becomes active at a first clock in the first cycle and is kept inactive the other times.

Therefore, for example, in the first cycle, an output of L-chip accumulator 101 appears on signal line 107-1 and supplied to data terminal of RAM 104-1 and a first input terminal of multiplier 121-1. That is, samples as many as L×N outputted from L-chip accumulator 101 in the first cycle are inputted to multiplier 121-1 and written to RAM 104-1. In a second cycle, data which were written to RAM 104-1 in the first cycle appear on signal line 107-1 and are supplied to multiplier 121-1. Similarly, in third through M-th cycles, data which were written to RAM 104-1 in the first cycle appear on signal line 107-1 and are supplied to multiplier 121-1 repeatedly.

When viewing from the first cycle to the M-th cycle as a whole, the samples as many as L×M which are outputted from L-chip accumulator 101 in the first cycle are repeatedly inputted to multiplier 121-1 for M times.

Similarly, the samples as many as L×M which are outputted from L-chip accumulator 101 in the second cycle are repeatedly inputted to multiplier 121-1 for M times, the samples as many as L×M which are outputted from L-chip accumulator 101 in the third cycle are repeatedly inputted to multiplier 121-1 for M times, and the samples as many as L×M which are outputted from L-chip accumulator 101 in the M-th cycle are repeatedly inputted to multiplier 121-1 for M times.

Coefficient generator 122 sets the value of coefficient $\alpha_1$ to −1 for the predetermined repetition number(s) of samples inputted from L-chip accumulator 10 in the first cycle and to +1 for the rest repetition number(s) of the samples. The predetermined repetition number(s) are determined by the pattern of the Search Code of L×M period. Similarly, coefficient generator 122 sets the value of coefficient $\alpha_2$ to −1 for the predetermined repetition number(s) of samples inputted from L-chip accumulator 101 in the second cycle and to +1 for the rest repetition number(s) of the samples, coefficient generator 122 sets the value of coefficient $\alpha_3$ to −1 for the predetermined repetition number(s) of samples inputted from L-chip accumulator 101 in the third cycle and to +1 for the rest repetition number(s) of the samples, and coefficient generator 122 sets the value of coefficient $\alpha_M$ to −1 for the predetermined repetition number(s) of samples inputted from L-chip accumulator 101 in the M-th cycle and to +1 for the rest repetition number(s) of the samples. Therefore, the times when coefficients $\alpha_1, \alpha_2, \alpha_3, \ldots, \alpha_M$ become −1 shift by one cycle from one to another.

In other words, the values of $\alpha_1, \alpha_2, \alpha_3, \ldots, \alpha_M$ are represented by the following equations:

$\alpha_1=\beta_1, \alpha_2=\beta_M, \alpha_3=\beta_{M-1}, \ldots, \alpha_M=\beta_2$ for the first cycle, $\alpha_1=\beta_2, \alpha_2=\beta_1, \alpha_3=\beta_M, \ldots, \alpha_M=\beta_3$ for the second cycle, $\alpha_1=\beta_3, \alpha_2=\beta_2, \alpha_3=\beta_1, \ldots, \alpha_M=\beta_M$ for the third cycle, and $\alpha_1=\beta_M, \alpha_2=\beta_3, \alpha_3=\beta_2, \ldots, \alpha_M=\beta_1$ for the M-th cycle, wherein $\beta_1, \beta_2, \beta_3, \beta_M$ are the coefficients of multipliers 904 as shown in FIG. 8.

Figure 3:
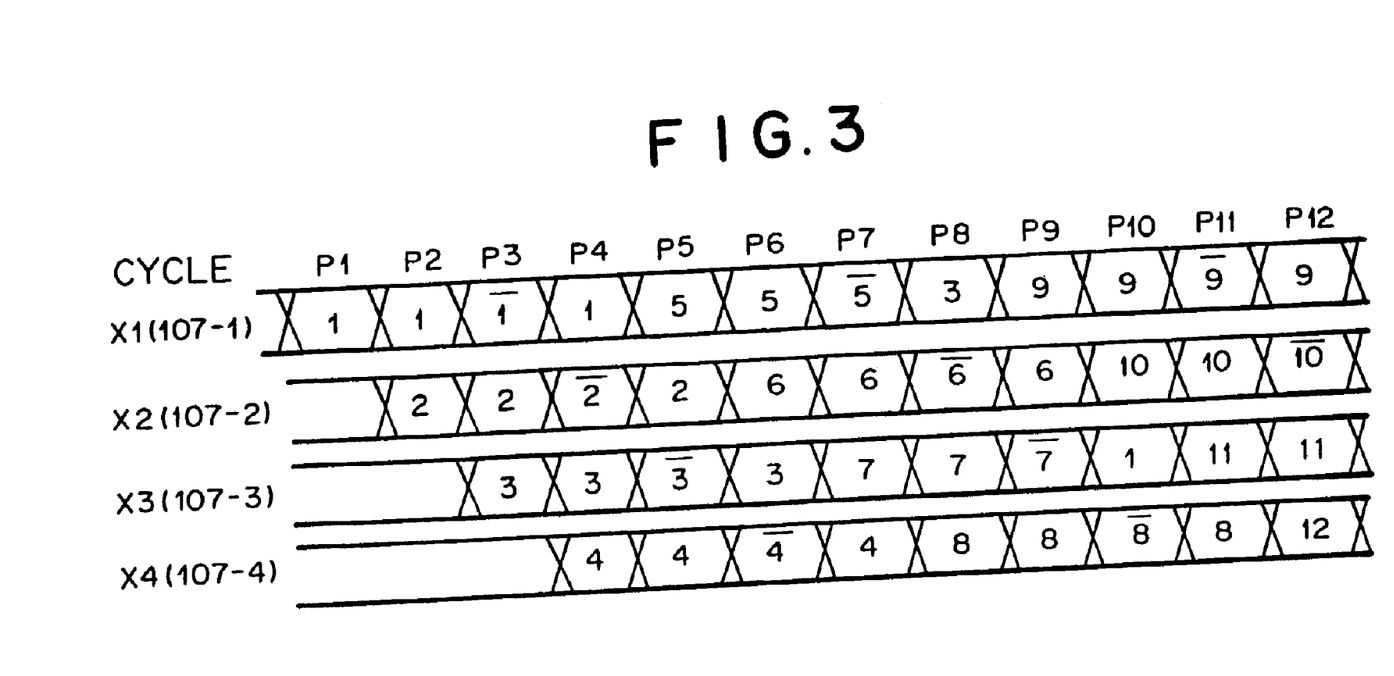
FIG. 3 is a timing chart showing signals inputted to adder 105 as shown in FIG. 1.

FIG. 3 is a timing chart which shows signals inputted to input terminals of adder 105 when M=4. In FIG. 3, it is assumed that the predetermined repetition number(s) mentioned above is only the number of three. Samples of the predetermined repetition number are represented by a numeral representing a sample group number with an upper line and samples of the repetition numbers other than the predetermined repetition number are =represented by a numeral representing a sample group number without an upper line.

Regular operation starts from cycle P4. Samples of sample groups 1, 2, 3 and 4 are inputted to adder 105 in cycle P4. Samples of sample groups 2, 3, 4 and 5 are inputted to adder 105 in cycle P5. Samples of sample groups 3, 4, 5 and 6 are inputted to adder 105 in cycle P6. In general, samples of sample group i, i+1, i+2 and i+3 are inputted to adder 105 in cycle P(i+3). Therefore, it is apparent that samples which are the same as samples inputted to adder 903 from shift register 902 are inputted to adder 105.

When focusing on one sample, the sample is inverted when the sample is inputted to adder 105 with a delay of (3-1)×L×N clocks. Therefore, it is possible to invert a sample when the sample is inputted to adder 105 with a delay of m×L×N clocks by varying the value of a i in accordance with the Search Code, wherein m is an integer and $1 \leq m \leq M$.

The correlation detecting apparatus of this embodiment may be realized by, for example, a gate array, a cell-based IC, and PLD (Programmable Logic Device).

Figure 4:
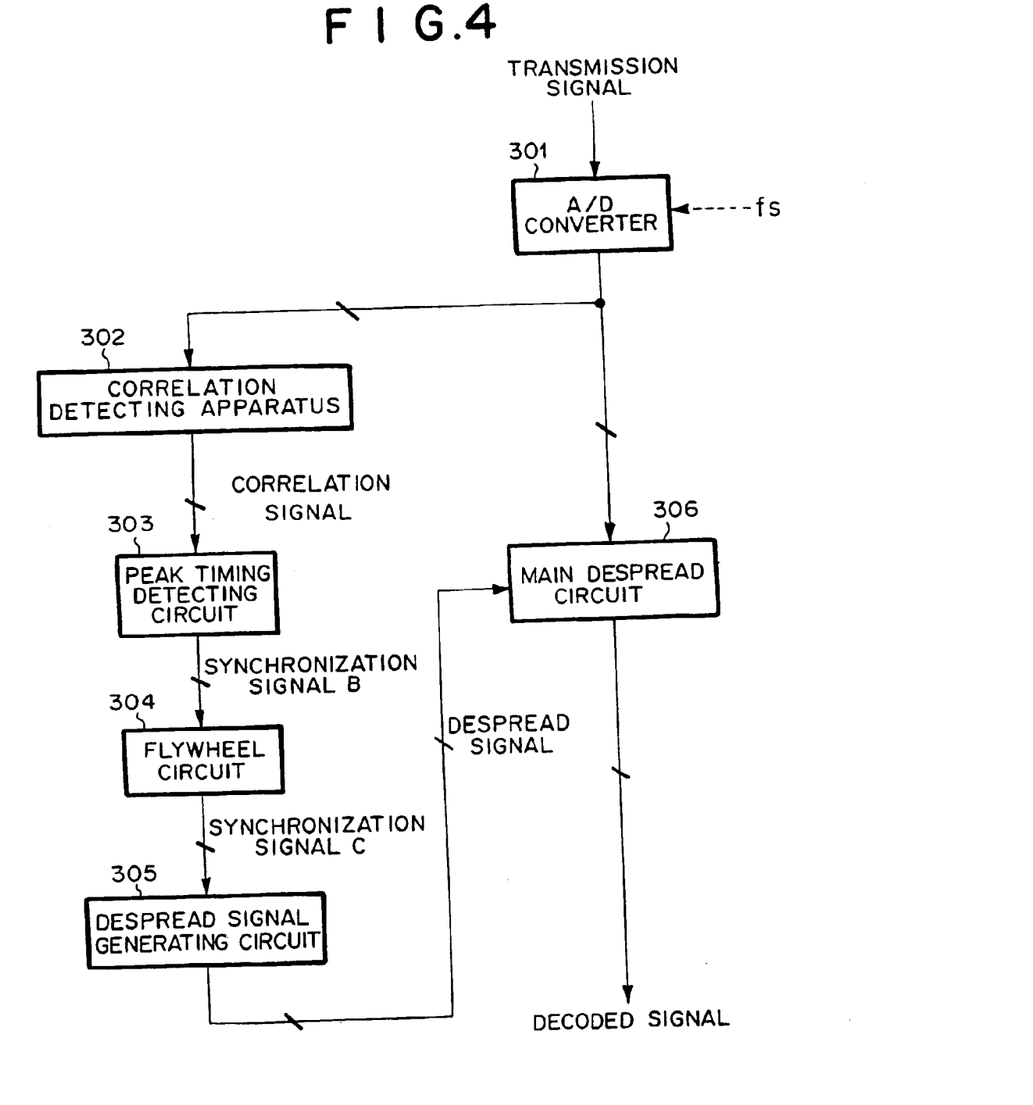
FIG. 4 is a block diagram showing the structure of a spectrum despread apparatus having the apparatus for detecting correlation as shown in FIG. 1.

FIG. 4 is a block diagram showing a structure of a spectrum despread apparatus having the correlation detecting apparatus of this embodiment. Here, the spectrum despread apparatus as shown in FIG. 4 is an example for explanation and a spectrum despread apparatus of the present invention is not limited to the apparatus as shown in FIG. 4.

Referring to FIG. 4, the spectrum despread apparatus of this embodiment comprises analog-to-digital converter 301 which digitizes an inputted transmission signal to sample signals of 8 bits with a sampling frequency which is N-fold of a chip rate, correlation detecting apparatus 302 as shown in FIG. 1 which generates a correlation signal from the sample signals, peak timing detecting circuit 303 which detects the peak timing of the correlation signal and outputs a peak timing detection signal as a synchronization signal B, flywheel circuit 304 which outputs a stable synchronization signal C on the basis of the synchronization signal B, despread signal generating circuit 305 which generates a despread signal by using the synchronization signal C as a phase reference, and main despread circuit 306 which desperad the sample signals with the despread signal to output a decoded signal.

As explained above, according to the present invention, reduction in circuit scale and in power consumption is realized, because it is avoided to use flip-flops and 2-port RAMs which necessitate large area and high power consumption for a portion other than the L-chip accumulator. For example, the number of cells are reduced to 60% and the power consumption is reduced to 22% as compared with the prior art when the number L of chips per bit period is 64, the number M of bit periods is 4, the oversampling ratio N is 4, and CMOS-9HD library which is a gate array of NEC is used. Therefore, a transmission/reception terminal which incorporates the correlation detection apparatus can be miniaturized and operate for a long time even if it operates with a battery.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for detecting a correlation of samples with a spread code, said samples being obtained by sampling a spectrum spread signal in a range of one symbol period with a oversampling rate which is N-fold of a chip rate, wherein N is an integer larger than zero, said spread code being of L×M period per symbol, wherein L and M are integers larger than one, said spectrum spread signal having been spread in spectrum by said spread code signal, said apparatus comprising:

an L-chip accumulator which inputs said samples to generate and output an intermediate correlation signal;

M memories, each of which stores L×M samples of said intermediate correlation signal;

an adder which has M input terminals and inputs from each of said input terminals one of said intermediate correlation signal which is outputted from said L-chip accumulator and said intermediate correlation signal which is outputted from a corresponding memory among said memories; and a controller which controls the supply of said intermediate correlation signal outputted from said L-chip accumulator to said M memories and to said M input terminals of said adder in rotation with a unit of L×N samples, and controls the supply to each of said input terminals of said adder, said intermediate correlation signal which has been stored in each of said memories M−1 times;

wherein an output of said adder is outputted as an correlation signal outputted from the apparatus.

2. The apparatus according to claim 1, further comprising:

M multipliers, each of which is connected with each of said memories and with each of said input terminals of said adder; and a coefficient generator which generates coefficients of said multipliers;

wherein each of said coefficients changes cyclically in a unit of L×N-fold of a period corresponding to said oversampling rate.

3. The apparatus according to claim 1, wherein said memories are one-port type of memories.

4. The apparatus according to claim 1, wherein said L-chip accumulator is a matching filter.

5. The apparatus according to claim 1, wherein said L-chip accumulator is a correlator bank.

6. An apparatus for detecting a correlation, comprising:

an accumulator which inputs a reception signal to output a first correlation signal in response to said reception signal, said first correlation signal including first data and second data following to said first data;

a first memory which stores said first data included in said first correlation signal;

a second memory which stores said second data included in said first correlation signal; and an adder;

wherein said first data is supplied to said adder, via a multiplier in a first period when said first data are written to said first memory;

wherein said second data, and said first data which have been stored in said first memory, are supplied to said adder, via said multiplier, in a second period when said second data are written to said second memory; and wherein an output of said adder is outputted as a final correlation signal.

7. An apparatus for detecting correlation, comprising:

an accumulator which outputs a first correlation signal in response to a reception signal;

a plurality of memories, each of said memories stores said first correlation signal in a respective prescribed period;

an adder which inputs via a multiplier, said first correlation signals from said plurality of memories and from said accumulator; and a controller which controls the supply to said adder of said first correlation signals which have been stored in memories other than a first memory among said plurality of memories when said first correlation signal is written to said first memory.

8. A spectrum despread apparatus comprising the apparatus according to claim 1.

9. A spectrum despread apparatus comprising the apparatus according to claim 6.

10. A spectrum despread apparatus comprising the apparatus according to claim 7.

11. A reception terminal comprising the apparatus according to claim 1.

12. A reception terminal comprising the apparatus according to claim 6.

13. A reception terminal comprising the apparatus according to claim 7.

14. A transmission/reception terminal comprising the apparatus according to claim 1.

15. A transmission/reception terminal comprising the apparatus according to claim 6.

16. A transmission/reception terminal comprising the apparatus according to claim 7.

17. A method for detecting a correlation of samples with a spread code, said samples being obtained by sampling a spectrum spread signal in a range of one symbol period with a oversampling rate which is N-fold of a chip rate, wherein N is an integer larger than zero, said spread code being of L×M period per symbol, wherein L and M are integers larger than one, said spectrum spread signal having been spread in spectrum by said spread code signal, said method comprising steps of:

generating an intermediate correlation signal by using said samples;

writing samples of said intermediate correlation signal to M memories in rotation with a unit of L×N samples;

simultaneously with the step of writing supplying the samples of said intermediate correlation signal to M input terminals of a multiplier whose outputs are fed to an adder reading L×M samples of said intermediate correlation signal which have been stored in each of said memories M−1 times;

supplying the samples read in the step of reading to each of said input terminals of said adder; and outputting an output of said adder as a correlation signal.

18. The method according to claim 17, further comprising a step of multiplying the samples supplied to each of input terminals of said adder with a coefficient with changes cyclically in a unit of L×N-fold of a period corresponding to said oversampling rate.

* * * * *